United States Patent [19]

Park et al.

[11] 3,922,689

[45] Nov. 25, 1975

[54] OPTICAL SYSTEM FOR A LIGHTHOUSE ENCLOSURE

[75] Inventors: Yong S. Park, North Hanover Park; Raymond J. Pekosh, Niles, both of Ill.

[73] Assignee: Zenith Radio Corporation, Chicago, Ill.

[22] Filed: May 1, 1972

[21] Appl. No.: 248,845

[52] U.S. Cl. .................... 354/1
[51] Int. Cl.² .................... G03B 41/00
[58] Field of Search .......... 95/1 R; 313/92 B; 354/1

[56] References Cited

UNITED STATES PATENTS

| | | | |
|---|---|---|---|
| 3,259,038 | 7/1966 | Burdick et al. | 95/1 R |
| 3,499,372 | 3/1970 | Staunton | 95/1 R |
| 3,601,018 | 8/1971 | Lange | 95/1 R |
| 3,636,836 | 1/1972 | Maddox et al. | 95/1 R |

*Primary Examiner*—Richard M. Sheer
*Attorney, Agent, or Firm*—John H. Coult

[57] ABSTRACT

An exposure chamber for exposing a photosensitive coating on the target surface of a color picture tube comprises means for supporting the face panel and an aperture mask in a parallel spaced and confronting relation transversely of the reference axis of the chamber. An optical system comprises a primary light source and a virtual light source, the latter including a collimator having a light emitter for irradiating the target surface through the aperture mask from a position offset from the center of the target. The emitter thus normally projects a non-uniform intensity distribution pattern and is surrounded by a light stop selectively masking a portion of the emitter to control the intensity distribution pattern of light impinging upon the target surface.

6 Claims, 7 Drawing Figures

OPTICAL SYSTEM FOR A LIGHTHOUSE ENCLOSURE

BACKGROUND OF THE INVENTION

This invention relates in general to the manufacture of color reproducing cathode ray tubes and in particular to improvements in the exposure chamber optical system employed to fabricate the multicolor luminescent target structure for such tubes.

In the manufacture of color reproducing cathode ray tubes, irrespective of whether the elemental areas of the screen take the form of dot triads or stripes, it is convenient to use a photosensitive resist in establishing the pattern of color phosphor elements. Usually in processing a three-color tube, all the elements of one color are developed in one operation, which operation is then repeated for each of the other colors. For example, in the slurry process of forming the screen section of a dot type color tube, a composition including a green phosphor, for example, and a photosensitive resist are applied as a thin layer over the entire inner or target surface of the face panel of the tube. An apertured shadow mask is then inserted in the face panel and this sub-assembly is mounted in a lighthouse transversely of its reference axis. In the assumed example, a light source, which is included in the lighthouse, is located to a position that corresponds to the location of the apparent center of deflection for the green electron gun of the tube, which is offset from the tube axis. The light source exposes the coated surface through the shadow mask and thereafter the resist is developed, leaving a pattern of green phosphor dots. Understandably, a uniform exposure of the coated target surface is desirable. This process, which is well known in the art and therefore need not be discussed further for an understanding of the present invention, is then repeated to apply the red and blue phosphor dots to the screen with the light source (emitting tip) located to appropriately offset positions.

In a practical application of the aforementioned screening technique, the light source is a linear mercury vapor lamp with a collimator associated therewith. The collimator has a light gathering surface disposed adjacent the lamp and a diffusing tip which serves to simulate a point light source. It is also the practice to employ a barrier, in the form of an apertured plate surrounding the tip of the collimator, to insure that only light exiting from the tip impinges upon the target surface. Partly because of the offset in light source position, the resulting exposure, in terms of light integration per unit area, turns out to be quite different from that required for uniform dot formation across the whole surface of the screen. Another part is chargeable to the distribution pattern of the exposing light source itself. It is known, for example, that the light has its greatest intensity essentially along the optical axis of the lighthouse and falls to a minimum value with increasing angle from the optical axis.

Another consideration, insofar as non-uniform light exposure is concerned, resides in the fact that the shadow mask apertures decrease in size with distance from the center for purposes related to the operation. Uniform dot size requires that the integration of light be uniform for each exposed elemental area, and it is apparent that the light distribution is inappropriate even were the mask to have a uniform aperture size throughout. Therefore, the fact that aperture size varies with distance from the center of the mask, taken in conjunction with the falling-off of light intensity with distance and angle from the optical axis, inevitably results in non-uniformity of target surface exposure.

In the prior art, efforts have been made to control the center-to-corner intensity of the exposing light in order to achieve desired sizes of color phosphor dots on the screen. One approach has been to install, in the optical system, a correcting lens having a variable thickness metal film deposited on that side of the lens that faces the light source. This metal film, which is deposited by evaporation, has a density gradient which is heaviest in the center and decreases towards the edges of the lens. This film may be likened to an absorption filter having a maximum effect along the optical axis of the light source and a gradient for controlling the distribution pattern of light intensity as desired. This technique does not correct for exposure differentials due to the offsetting of the point source of light, or as it is referred to in the art, the corner-to-corner exposure differential. Attempting to vary or offset the density distribution of the lens coating to correct for corner-to-corner non-uniformity would prove difficult.

It is therefore an object of the invention to provide a new and improved method and apparatus for manufacturing screened face panels for color television picture tubes.

It is another object of the invention to provide a method and apparatus for exposing the target surface of a cathode ray tube which overcome the shortcomings of the prior art.

It is a specific object of the invention to provide apparatus for effecting a substantially uniform exposure of the target surface of a cathode ray tube from a non-symmetrical position.

It is also an object of the invention to provide apparatus for more efficiently utilizing the light source employed for exposing the screen surface of a color picture tube.

SUMMARY OF THE INVENTION

In accordance with the invention an exposure chamber for uniformly exposing portions of a photosensitive coating deposited on the target surface of a cathode ray tube face panel comprises means for supporting the face panel substantially transversely of the reference axis of the exposure chamber. A mask, supported in a parallel spaced and confronting relation to the target surface, has transparent and opaque portions which collectively define the exposure pattern desired for application to the photosensitive coating. The chamber includes an optical system comprising a primary light source and a virtual light source, the latter comprising a collimator located upon an axis offset from, but substantially parallel to the reference axis of the chamber. The collimator has a light gathering surface disposed adjacent the primary light source and a light emitter for irradiating the target surface through the aperture mask. Finally, a light stop surrounding the collimator emitter partially masks a portion of the surface of the emitter in a predetermined direction to control the intensity distribution pattern of light impinging upon the target surface.

BRIEF DESCRIPTION OF THE DRAWINGS

The features of the present invention which are believed to be novel are set forth with particularity in the appended claims. The invention, together with further objects and advantages thereof, may best be understood by reference to the following description taken in conjunction with the accompanying drawings, in the several figures of which like reference numerals identify like elements and in which:

Figure 1:
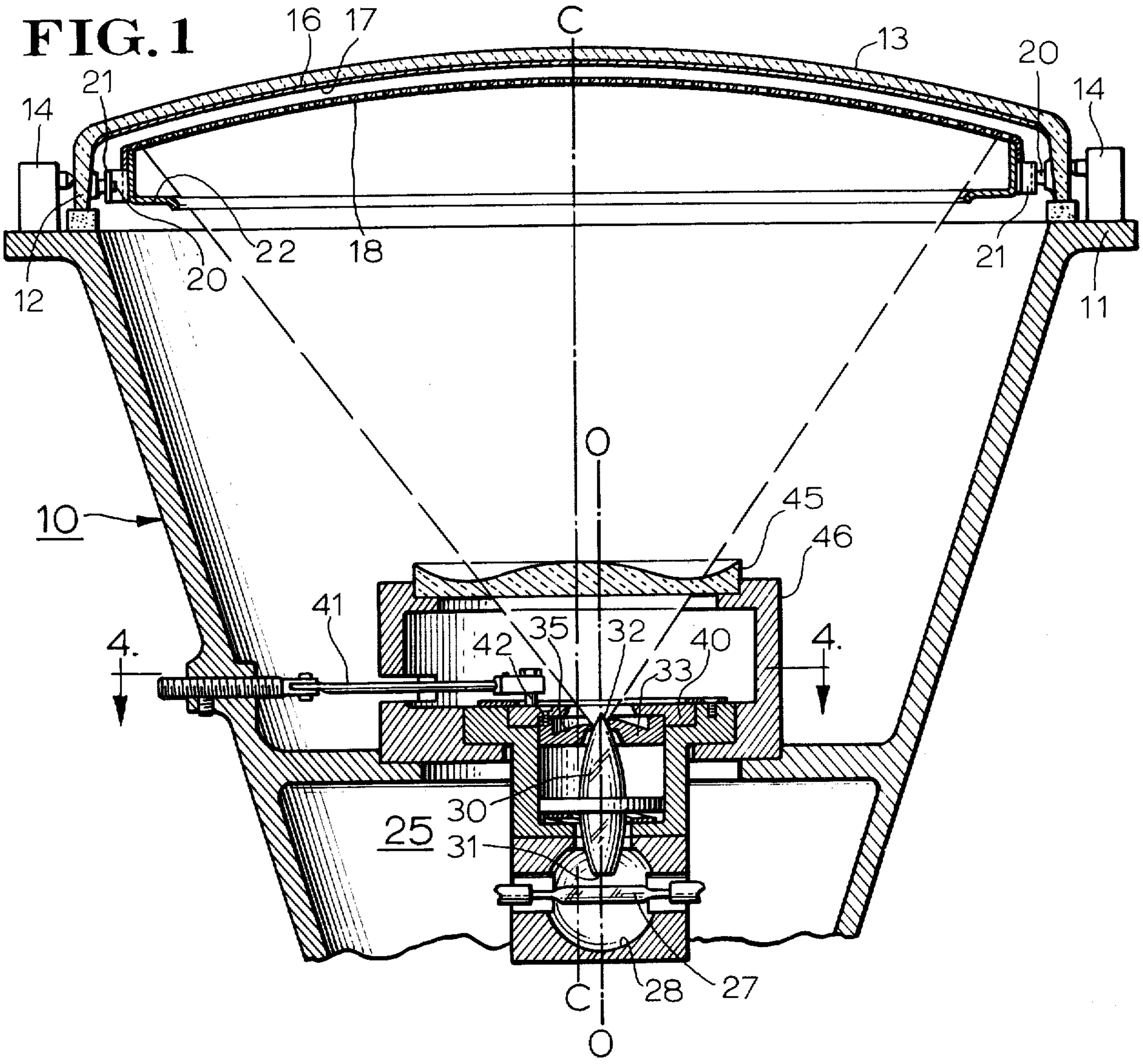
FIG. 1 is an elevational view, partly in section, of a photographic "lighthouse" having an optical system constructed in accordance with the invention.

Referring now more particularly to FIG. 1, the lighthouse arrangement there illustrated is of the type employed in fabricating a multicolor luminescent screen for the face panel of a color reproducing cathode ray tube. As presently constructed, the envelope of such a tube comprises a face panel section, having the multicolor screen formed on the target surface thereof, and a funnel section, one end of which is dimensioned and shaped to correspond to the free end or flange of the face panel. The face panel and funnel are eventually bonded together to form a unitary envelope. The end of the funnel opposite the face panel terminates in a narrow neck that receives and supports an electron beam generator, which usually takes the form of a trio of electron guns symmetrically located about the longitudinal axis of the tube. In keeping with the dictates of commercial practice the configuration of the panel section is rectangular, although it should be appreciated that the invention is also applicable to a round face tube. In any event, the multicolor screen is formed on the inner or target surface of the face panel before the panel and funnel sections are assembled. Since the present invention is directed solely to screening, no further consideration will be given to the other processing steps employed in fabricating a color picture tube.

It will also be convenient for the detailed discussion of a specific embodiment of the invention to assume that the tube is of the dot triad type having three groups of phosphor dots or elements which groups, in response to electron excitation, individually emit light of one of the three primary colors. Each color group is formed by the same method except that only one such group is formed in any one processing cycle. Moreover, while the exposing position for the light source is different for each of the three phosphors, the function of the lighthouse optical system is the same irrespective of the phosphor group being fabricated; therefore, insofar as the subject invention is concerned, it is sufficient to consider only one exposure process without any concern for the particular color component that may be involved.

The lighthouse of FIG. 1 comprises an exposure chamber 10 which is represented in a simplified schematic form that omits the cooling, adjusting and indexing mechanisms which are of no concern to the present invention. Except for having an open top, chamber 10 is substantially enclosed on all sides. A shelf 11, which is formed about the top of the enclosure, receives the peripheral flange 12 of the face panel section 13 of a color reproducing cathode ray tube to support that panel substantially transversely of the reference axis C—C of chamber 10. A set of fixtures (only two shown) 14, is attached to shelf 11 and engages the outer walls of flange 12 to facilitate rapid and accurate indexing of panel 13 relative to the axis of an optical system enclosed in chamber 10, which system is detailed below. Thus the reference axis C—C of the chamber coincides with the center of panel 13.

The face panel comprises an inner target surface 16 upon which a photosensitive coating 17 has previously been deposited. A color selection electrode 18, in the form of a metal mask having transparent and opaque portions that collectively define the exposure pattern desired for application to coating 17, is supported in a substantially parallel spaced and confronting relation to target surface 16 of the face panel. The manner of supporting mask 18 is of no particular concern so long as it is firmly retained within the face panel in a demountable fashion. To this end it is common practice to provide the inside wall of face panel flange 12 with three studs 20 (only two shown) which individually receive one of three mounting springs 21 secured to a frame member 22 that circumscribes mask 18.

In order to expose coating 17, an optical system 25 is mounted in the lighthouse. This system comprises a primary light source usually in the form of a linear mercury lamp 27 about which a spherical reflector 28 is positioned. System 25 further comprises a virtual light source that includes a collimator 30 through which the optical axis O—O of system 25 extends. As shown in FIG. 1, the optical axis of the collimator is located offset but substantially parallel to the reference axis C—C of the chamber. The collimator which conveniently assumes the shape of a bullet, has at one end a light gathering surface 31 in registration with lamp 27, and a light emitting tip 32 at the opposite end. Tip 32 effectively constitutes a point source of light and its location corresponds to the center of deflection of that electron beam which the light source is intended to simulate during the photographic exposure process. Generally the center of deflection is located near the center of the deflection yoke that is designed for use with the completed tube. Actually, there are three centers of deflection, one for each of the primary colors and these centers are spaced approximately 120° apart. In short, the position of the light source and its spacing from target surface 16 for any of the three exposure steps are well defined in terms of the center of deflection and in a manner thoroughly understood in the art.

Figure 2:
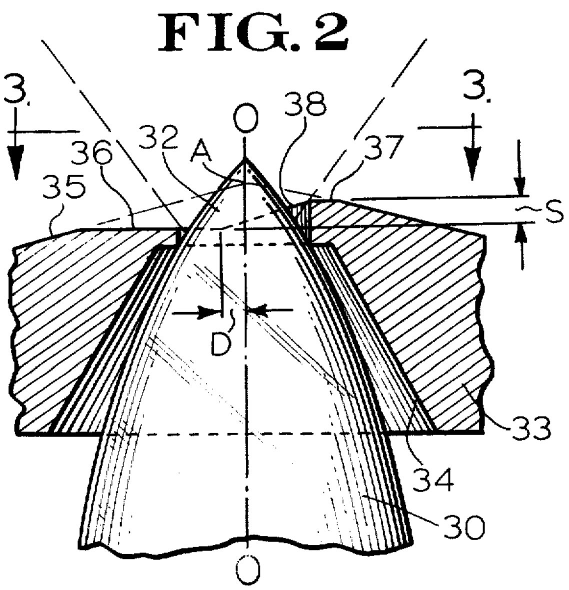
FIG. 2 is an enlarged view of portions of the collimator and light stop of the lighthouse of FIG. 1.
Figure 3:
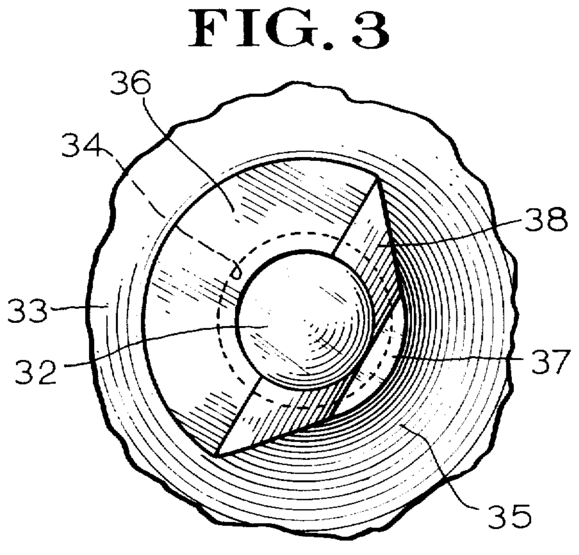
FIG. 3 is a plan view of the collimator tip and light stop portions shown in FIG. 2.
Figure 4:
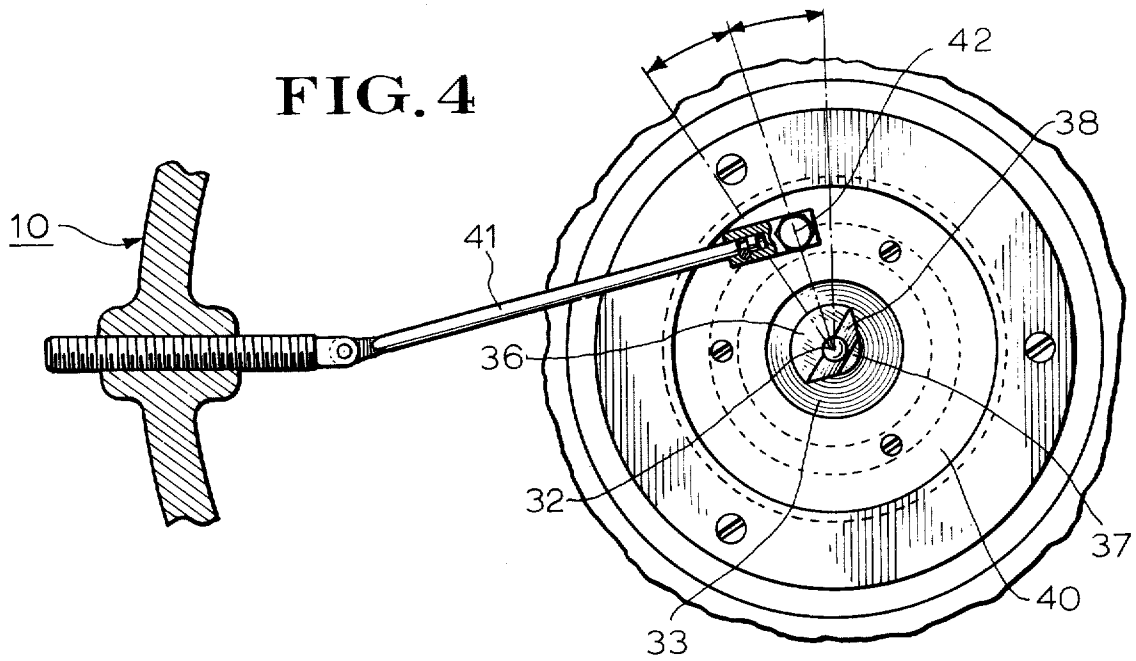
FIG. 4 is a sectional view taken along lines 4—4 of of FIG. 1 detailing an adjustable control for the light stop.

Surrounding collimator 30 is a light stop 33 which confines the light rays "seen" by the target to collimator tip 32. More particularly, stop 33 is provided with an aperture 34 through which emitter tip 32 protrudes. Stop 33 comprises a substantially circular member while its aperture 34 is chamfered to receive the tapered emitter tip of the collimator. The upper surface of stop 33 is relieved in such a fashion as to form a gently tapering cone 35 having a virtual apex at point A. The upper portion of cone 35 is multilated so as to form a flattened surface 36 parallel to the bottom side of the stop and extending partially across the exit of aperture 34. The cone is further mutilated to form, at a higher elevation as viewed in FIG. 2, a second flattened surface 37. A sloping shoulder 38, which interconnects surfaces 36, 37, masks a portion of the collimator tip. The slope of shoulder 38, and thus the degree of masking achieved, is determined in part by the elevation E of surface 37 relative to surface 36 and in part by the lateral distance D of the edge of surface 36 from the optical axis O—O. In order to facilitate achieving a desired light intensity distribution pattern, an adjustment or tuning means for light stop 33 is provided. To this end, and as best seen in FIG. 4, stop 33 is secured to a rotatably mounted adaptor ring 40 which, in turn, is coupled to a rotatable articulated rod 41 via a drive pin 42. That end of shaft 41 remote from the drive pin is threadably received in a side wall of the lighthouse enclosure and extends therethrough for manipulation by the operator. As can be appreciated from the drawings, adjustment of rod 41 serves to rotate light stop 33 about the collimator tip so that shoulder 38 masks a portion of the tip when viewed from certain areas of the target; in this fashion shoulder 38 can be used to compensate for the uneven light distribution pattern created by the offset between axis C—C and O—O. In a specific embodiment of the invention which has been constructed and operated it has been determined that an angular rotation of stop 33 plus and minus 15° from the reference position, see FIG. 4, is sufficient to obtain a desired compensation of the light pattern.

It is generally conceded that each aperture in the shadow mask behaves as a pin hole camera and consequently the light falling on elemental areas of the target surface are "pictures" of the source or emitting tip. In essence the tunable stop decreases the area of the tip visible to certain portions of the target surface and this results in a decrease in exposure energy in these portions.

Light intensity varies inversely with source to target distance. Consequently, a lateral shift from the source from a point on axis C—C to a point on offset axis O—O will result in a decrease in intensity in areas now more remote from the source and an increase in areas now closer to the source. The provision of stop 33 allows compensation for this by decreasing the effective source area visible to the last mentioned areas. Making the stop adjustable (tunable) enables compensation in the directions of offset encountered in a delta gun color tube set of lighthouses.

Interposed between the collimator and the aperture mask is a lens 45 which constitutes an optical device for correcting misregistration errors. A lens of this type is described in U.S. Pat. No. 3,003,874 which issued to Sam H. Kaplan on Oct. 10, 1961 and is assigned to the same assignee as the present invention. Lens 45 is supported transversely of reference axis C—C by means of a shelf 46 which is apertured sufficiently so as to not adversely interfere with the optical system.

Ignoring details of tunable stop 33 for the moment, upon energization of the primary light source the coating 17 on the target surface will be exposed through the mask and receive a latent image of the mask. Resort then to conventional photographic procedures results in the formation of a group of phosphor dots on the target surface of the face panel.

Figure 5A:
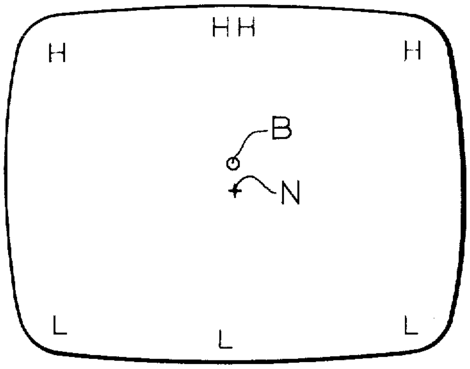
FIGS. 5A, 5B and 5C represent idealized light distribution patterns produced on target surfaces with conventional exposure systems.

As already discussed an uncorrected prior art light source has a non-uniform intensity distribution pattern in that the light output of the collimator exhibits maximum intensity generally along the direction of the optical axis with the intensity falling off in all radial directions at increasing angles relative to the optical axis. However, for purposes of description, assume an absolutely uniform distribution of energy over the target surface. As shown in FIG. 5A, the collimator tip is indicated by point B and is positioned to a location which is a counterpart of the blue electron gun. The light distribution pattern is shown to include a higher level of illumination over the upper portion of the target surface than that over the lower portion of the target. This is due to the offset between points B and N, the latter representing the center of the target. Similarly, when the light source or collimator tip is located at a position corresponding to the red electron beam source, point R in FIG. 5B the lefthand portion, in particular the lower lefthand corner, receives more energy than the righthand side of the target. Finally, when the tip is shifted to a location corresponding to the source of the green beam, as indicated by point G in FIG. 5C, the righthand portion of the target, particularly the lower righthand corner, receives more energy than the lefthand portion of the target. In each of FIGS. 5A, 5B and 5C, the point N represents the target axis C—C, points B, R and G the optical axis O—O and the degree of relative illumination is indicated by the letters "H" (for high) and "L" (for low). Thus it is seen that prior art optical systems normally exhibit a change in intensity distribution when projected upon the target resulting from offsetting the collimator tip.

Figure 5B:
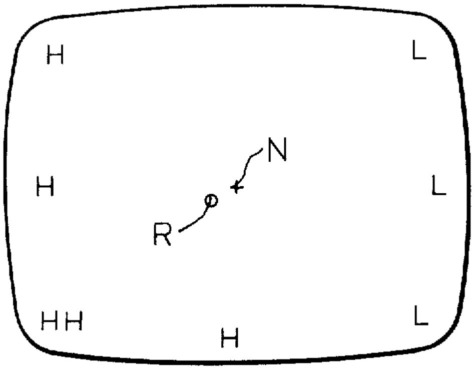
Figure 5C:
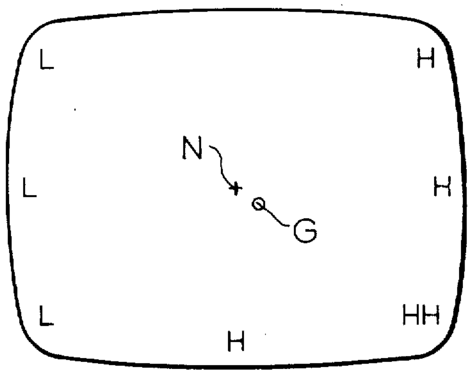

The described light stop 33 by incorporating shoulder 38 serves to mask at least a portion of the light output from the collimator tip. Specifically, and with reference to FIG. 5A, when applied to a collimator, the shouldered light stop 33, 38 serves to reduce the amount of light directed towards the upper portion of the target, areas designated H. In other words, the shoulder portion of the stop is so positioned relative to the collimator tip as to reduce the amount of light directed toward the upper portion of the target so that the target area now exhibits a substantial uniform light intensity distribution pattern. Moreover, by providing an adjustable control 41 for the shouldered stop 33, 38, the degree of masking can be selected so as to achieve a desired pattern of illumination on the target surface. In the same fashion the light distribution patterns shown in FIGS. 5B and 5C are adjustable to a desired pattern by locating a shouldered light stop, of the type herein described, along the optical axes designated R and G, respectively.

While a particular embodiment of the invention has been shown and described, it will be obvious to those skilled in the art that changes and modifications may be made without departing from the invention in its broader aspects and, therefore, the aim in the appended claims is to cover all such changes and modifications as fall within the true spirit and scope of the invention.

We claim:

1. An exposure chamber for exposing portions of a photosensitive coating deposited on the target surface of a cathode ray tube face panel comprising:

- means for supporting said face panel on a reference axis of said exposure chamber;
- a mask and means for supporting said mask in a parallel spaced and confronting relation to said target surface, said mask having a pattern of apertures defining an exposure pattern desired for application to said coating; and
- a coating illumination system comprising:
  - a source of radiation actinic to said coating,
  - means for collecting radiation from said source and for forming a small effective source offset from said reference axis a predetermined radial distance for off-axially irradiating said coating through said mask, and radiation attenuating means comprising a stop immediately surrounding said effective source and having an asymmetrical radiation attenuation structure which is substantially aligned with the direction of said offset of said effective source from said reference axis and which is effective to reduce the illumination of the coating predominantly in areas on the same side of said reference axis as said effective source such as to reduce the asymmetry in illumination which results from the off-axis positioning of said effective source.

2. The apparatus defined by claim 1 wherein said means for collecting radiation is a collimator having an emitting tip at which said effective point source is formed, wherein said stop has an aperture shaped and oriented to effect said reduction of said illumination of the coating to compensate for the off-axis positioning of said collimator tip.

3. The apparatus defined by claim 2 wherein said aperture defined by said stop has an axially forwardly extending barrier substantially aligned with the direction of offset of said tip from said reference axis such that the radiation attenuation effected by said stop is greater off-axis in the direction of said barrier than in the diagonally opposed off-axis direction.

4. An exposure chamber as set forth in claim 3 which further includes means for angularly adjusting said stop means.

5. An exposure chamber for exposing portions of a photosensitive coating deposited on the target surface of a cathode ray tube face panel comprising:

means for supporting said face panel on a reference axis of said exposure chamber;

a mask and means for supporting said mask in a parallel spaced and confronting relation to said target surface, said mask having a pattern of apertures defining an exposure pattern desired for application to said coating; and a coating illumination system comprising:

a source of radiation actinic to said coating, means for collecting radiation from said source and for forming a small effective source offset from said reference axis a predetermined radial distance for off-axially irradiating said coating through said mask, and a stop immediately surrounding said effective source and comprising a substantially circular member having an aperture to receive said effective source and having a target-facing surface comprising first and second surfaces, said second surface displaced axially forwardly of said first surface, said first and second surfaces interconnected by a sloping shoulder surface, and said stop, as defined by said first, second, and interconnecting surfaces, providing asymmetric masking of said effective source such that when said second surface is substantially rotationally aligned with the direction of offset of said effective source from said reference axis, said stop is effective to reduce the illumination of the coating predominantly in areas on the same side of said reference axis as said effective source to reduce the asymmetry in illumination which results from the off-axis positioning of said effective source.

6. An exposure chamber as set forth in claim 5 which further includes means for angularly adjusting said stop.

* * * * *